United States Patent
Boland et al.

(10) Patent No.: US 7,634,833 B2
(45) Date of Patent: Dec. 22, 2009

(54) WINDSCREEN WIPER DEVICE

(75) Inventors: Xavier Boland, Arlon (BE); Pierre Henin, Bellefontaine (BE); Eric Coos, Chenieres (FR)

(73) Assignee: Federal-Mogul SA., Aubange (BE)

( * ) Notice: Subject to any disclaimer, the term of this patent is extended or adjusted under 35 U.S.C. 154(b) by 0 days.

(21) Appl. No.: 11/930,503

(22) Filed: Oct. 31, 2007

(65) Prior Publication Data
US 2008/0060161 A1    Mar. 13, 2008

Related U.S. Application Data

(62) Division of application No. 10/528,856, filed on Sep. 12, 2005, now Pat. No. 7,305,734.

(51) Int. Cl.
B60S 1/40 (2006.01)
B60S 1/34 (2006.01)

(52) U.S. Cl. ............... 15/250.32; 15/250.201; 15/250.351

(58) Field of Classification Search .............. 15/250.32, 15/250.351, 250.201, 250.43, 250.44, 250.451, 15/250.452, 250.46
See application file for complete search history.

(56) References Cited

U.S. PATENT DOCUMENTS

| | | | |
|---|---|---|---|
| 4,418,441 A | 12/1983 | van den Berg | |
| 4,896,987 A | 1/1990 | Pethers | |
| 6,599,051 B1 | 7/2003 | Jarasson | |
| 6,654,983 B1 | 12/2003 | Raynaud | |
| 6,668,419 B1 | 12/2003 | Kotlarski | |
| 7,305,734 B2 * | 12/2007 | Boland et al. ............ | 15/250.32 |
| 7,398,577 B2 * | 7/2008 | Genet ...................... | 15/250.32 |
| 2004/0211021 A1 | 10/2004 | Weber et al. | |

FOREIGN PATENT DOCUMENTS

| | | |
|---|---|---|
| DE | 4224866 | 2/1994 |
| DE | 10130903 | 5/2002 |
| EP | 0 231 129 | 8/1987 |
| EP | 0 236061 | 9/1987 |
| EP | 0 267 010 | 5/1988 |
| EP | 0895 907 | 2/1999 |
| FR | 2 453 757 | 11/1980 |
| FR | 2 759 048 | 8/1998 |
| FR | 2 771 694 | 6/1999 |
| FR | 2 781 741 | 2/2000 |
| FR | 2 788 027 | 7/2000 |
| FR | 2 804 923 | 8/2001 |

(Continued)

*Primary Examiner*—Gary K Graham
(74) *Attorney, Agent, or Firm*—Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a widescreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating arm, wherein said oscillating arm is pivotally connected to said connecting device about a pivot axis near one end, with the interposition of a joint part, with the special feature that said connecting device is positioned at least substantially within said joint part.

4 Claims, 4 Drawing Sheets

FOREIGN PATENT DOCUMENTS

| WO | 00/07857 | 2/2000 |
| WO | WO 00/40444 | 7/2000 |
| WO | WO 02/34594 | 5/2002 |
| WO | WO 02/34594 A1 | 5/2002 |
| WO | WO 02/053421 | 7/2002 |

* cited by examiner

WINDSCREEN WIPER DEVICE

RELATED APPLICATIONS

This is a divisional application and claims priority to U.S. Ser. No. 10/528,856, filed Sep. 12, 2005 now U.S. Pat. No. 7,305,734.

BACKGROUND OF THE INVENTION

Technical Field

The present invention relates generally to a windscreen wiper device. More particularly, the invention relates to a windscreen wiper device which includes an elastic elongated carrier element and an elongated wiper blade of a flexible material.

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near one end, with the interposition of a joint part.

Such a windscreen wiper device is known from German patent publication no. 101 30 903 (Robert Bosch GmbH). This prior art windscreen wiper device is designed as a "yokeless" wiper device, wherein no use is made of several yokes pivotally connected to each other, but wherein the wiper blade is biased by the carrier element, as a result of which it exhibits a specific curvature. This known device has a first coupling half fixed to the oscillating arm, as well as a second coupling half fixed to the wiper blade, wherein-two parallel interspaced supporting walls of the second coupling half are oriented in the longitudinal direction of the wiper blade. Each end of a pivot pin for a joint part, which is mounted on the pivot pin in a manner that permits it to swing between the supporting walls and which is provided for connecting the oscillating arm, is held in these supporting walls. In order to obtain protection against environmental influences such as snow, ice and dust, the oscillating arm is u-shaped in the area of its coupling half, whereby the U-base covers the supporting (protective) walls and both U-limbs cover the outer sides of these supporting walls.

A disadvantage of the windscreen wiper device known from the above-mentioned German patent document is that, due to high forces exerted in practice on the connection between the connecting device and the oscillating arm, the reliability of said connection appears to diminish with the passage of time, resulting in play between the connecting device and the oscillating arm. Such a play in practice has proven to lead to frictional contact between these parts and therefore to wear. A further disadvantage thereof is that many constructional parts are involved in the connection between the connecting device and the oscillating arm, making the known windscreen wiper device laborious to manufacture and therefore relatively costly.

SUMMARY OF THE INVENTION

The object of the invention is to overcome these drawbacks of the prior art as indicated above, in particular to provide a windscreen wiper device wherein the connecting device and the oscillating arm are interconnected in a simple though durable and solid manner.

In order to accomplish that objective, a windscreen wiper device of the type referred to in the introduction is characterized in that said connecting device is positioned at least substantially within said joint part. Particularly, this enables to attach said joint part to said connecting device by protrusions of said connecting device at the location of said pivot axis, said protrusions pivotally engaging in recesses provided in said joint part. These protrusions that function as bearing surfaces are spaced far apart, so that the forces exerted on the bearing surfaces will be relatively low. As these protrusions replace the pivot pin as used in the known windscreen wiper device discussed above, less constructional components are used in connecting the connection device and the oscillating arm together. For an optimal articulation at the location of the protrusions the distance between these protrusions divided by the length of the wiper blade, from tip to tip, is larger than 0.02.

In one preferred embodiment of a windscreen wiper device according to the invention said joint part has an at least substantially U-shaped cross-section at the location of its attachment to said connecting device, wherein said joint part in each leg of said U-shaped cross-section is provided with a recess provided coaxially with said pivot axis. Preferably, the protrusions extend outwards on either side of said connecting device (that is, outwardly in lateral direction with respect to the oscillating arm), wherein the protrusions are at least substantially cylindrical. Particularly, the recesses are correspondingly shaped.

In another preferred embodiment of a windscreen wiper device according to the invention said joint part is made of plastic, which includes any synthetic material having some flexibility.

In another preferred embodiment of a windscreen wiper device according to the invention said joint part comprises at least one resilient tongue engaging in a correspondingly shaped hole provided in said oscillating arm. Preferably, the oscillating arm has an at least substantially U-shaped cross-section at the location of its connection to said joint part, wherein said hole is provided in a base of said U-shaped cross-section.

In another preferred embodiment of a windscreen wiper device according to the invention said joint part comprises at least two lateral resilient tongues extending outwardly, wherein the oscillating arm has an at least substantially U-shaped cross-section at the location of its connection to said joint part, and wherein each tongue engages in a correspondingly shaped hole provided in a leg of said U-shaped cross-section.

While mounting the oscillating arm onto the connecting device/joint part, the resilient tongue (s) is/are initially pushed in against a spring force and then allowed to spring back into said hole (s), thus snapping, that is clipping the resilient tongue (s) into the hole (s).

In another preferred embodiment of a windscreen wiper device according to the invention said hole (s) has/have a closed circumference. Such (a) closed hole (s) enhance (s) the retention of the oscillating arm onto the connecting device/joint part in all directions, particularly both horizontally and vertically.

In another preferred embodiment of a windscreen wiper device according to the invention the oscillating arm has an at least substantially U-shaped cross-section at the location of its connection to said joint part, and wherein each leg comprises clamping members which engage around longitudinal sides of said joint part that face away from each These clamping members being preferably formed as inwardly bended edges integral with the legs of the U-shaped cross-section, serve to further enhance the retention of the oscillating arm onto the connecting device/joint part in vertical direction, that is perpendicular to the longitudinal direction of the oscillating arm. other.

BRIEF DESCRIPTION OF THE DRAWINGS

The invention will now be explained in more detail with reference to figures illustrated in a drawing, wherein.

DETAILED DESCRIPTION OF THE PREFERRED EMBODIMENT

Figure 1:
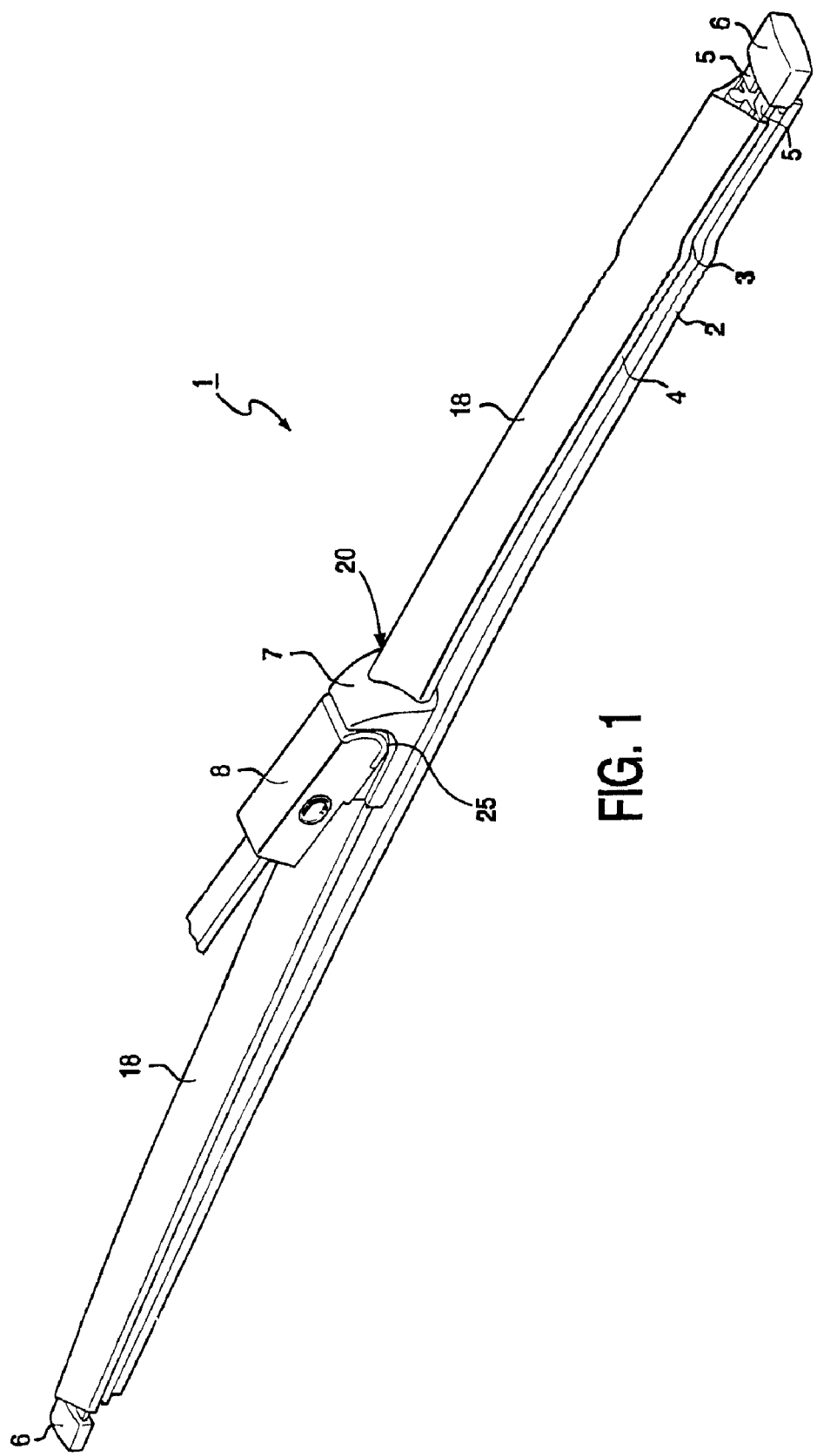
FIG. 1 is a perspective, schematic view of a preferred embodiment of a windscreen device in accordance with the invention.

FIG. 1 shows a preferred variant of a windscreen wiper assembly or device 1 according to the invention. Said windscreen wiper device is built up of an elastomeric wiper blade or blade element 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends 5 of strips 4. In another preferred variant, said connecting pieces 6 are in one piece with the strips 4 made of spring band steel. In the latter case said connecting pieces form transverse bridges for the strips 4, as it were.

The windscreen wiper device 1 is furthermore built up of a connecting device 7 of plastic material for an oscillating arm or wiper arm 8. Connecting device 7 comprises clamping members 9 that are integral therewith, which engage around longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end, and that in the following manner. The strips 4 and connecting device 7 function as a carrier 19 supporting the wiper blade element 2 and together comprises a wiper member 20.

Figure 2A:
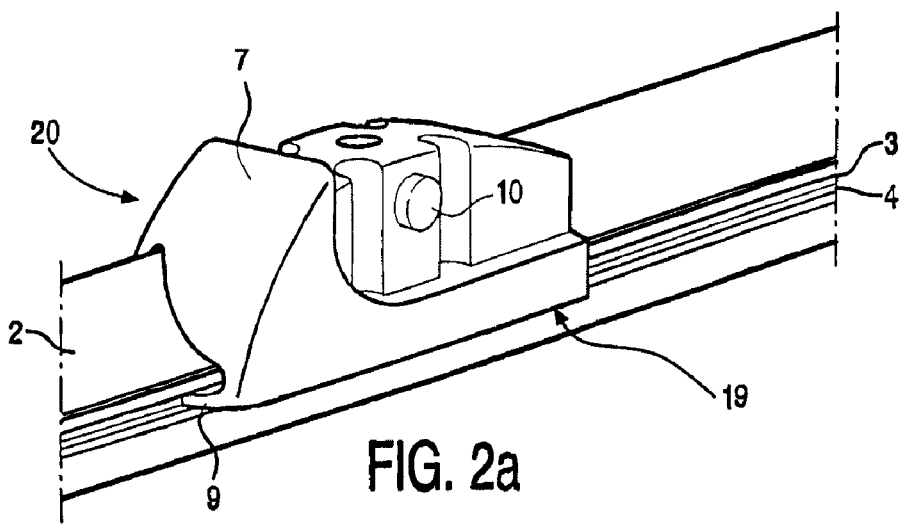
FIGS. 2 and 3 show details of the windscreen wiper device of FIG. 1, wherein various successive steps are shown for fitting an oscillating wiper arm to a connecting device using two different types of joint parts ("spacers")
Figure 2B:
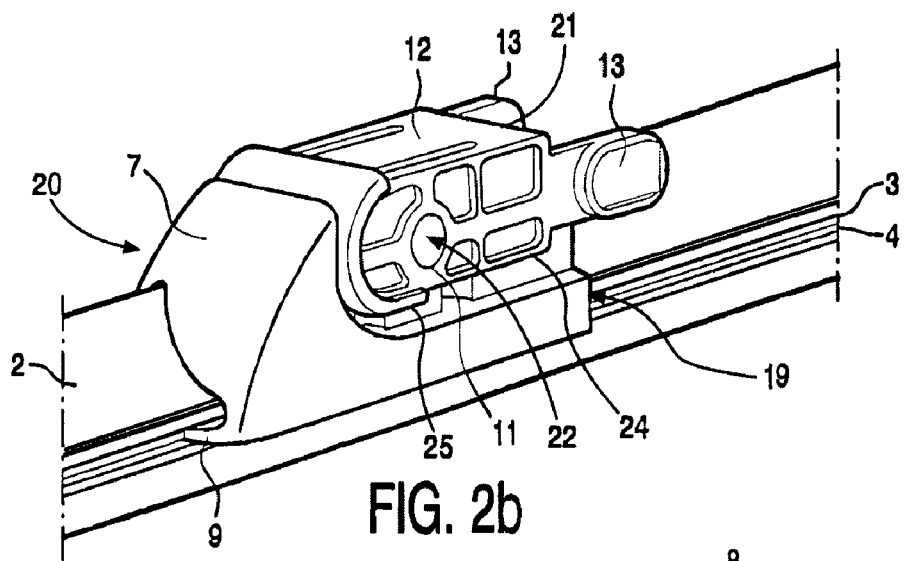
Figure 2C:
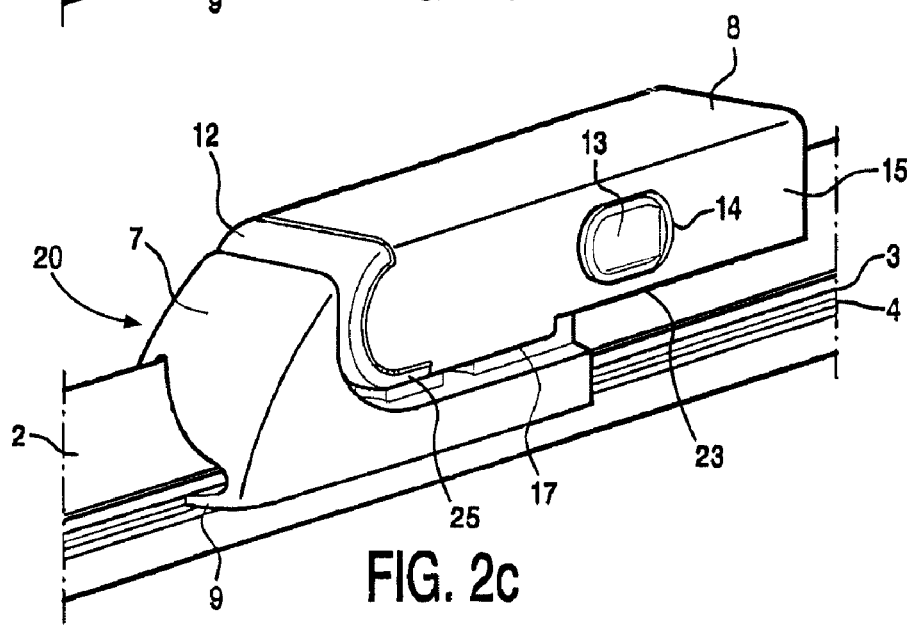

With reference to FIG. 2 the connecting device 7 comprises two cylindrical protrusions 10 extending outwards on either side of said connecting device 7 (FIG. 2a). These protrusions 10 pivotally engage in identically shaped cylindrical recesses 11 of a plastic joint part 12 (FIG. 2b) and provide a pivot shaft 10. Said protrusions 10 act as bearing surfaces at the location of a pivot axis in order to pivot the joint part 12 (and the oscillating wiper arm 8 attached thereto) about said pivot axis near one end of said arm 8. As shown best in FIG. 2b, the joint part 12 has a downwardly opening recess 21 in which the connector 7 and pivot shaft 10 is received with a snap fit to establish a pivot connection 22 between the joint part 12 and the wiper member 20 about the pivot axis of the shaft 10. The protrusions 10 are preferably in one piece with the connecting device 7; in the alternative, the protrusions 10 are part of a single pivot pin perpendicular to the connecting device 7. Said connecting device 7 may be equipped with a cover or cap in order to obtain an aesthetic appearance thereof, to avoid sharp edges and to provide protection against UV-light etcetera. The joint part 12 comprises two lateral resilient tongues 13 extending outwardly, while the oscillating arm 8 has a U-shaped cross-section at the location of its connection to said joint part 12, so that each tongue 13 engages in an identically shaped hole 14 provided in a leg or side wall 15 of said U-shaped cross-section (FIG. 2c).

Figure 3A:
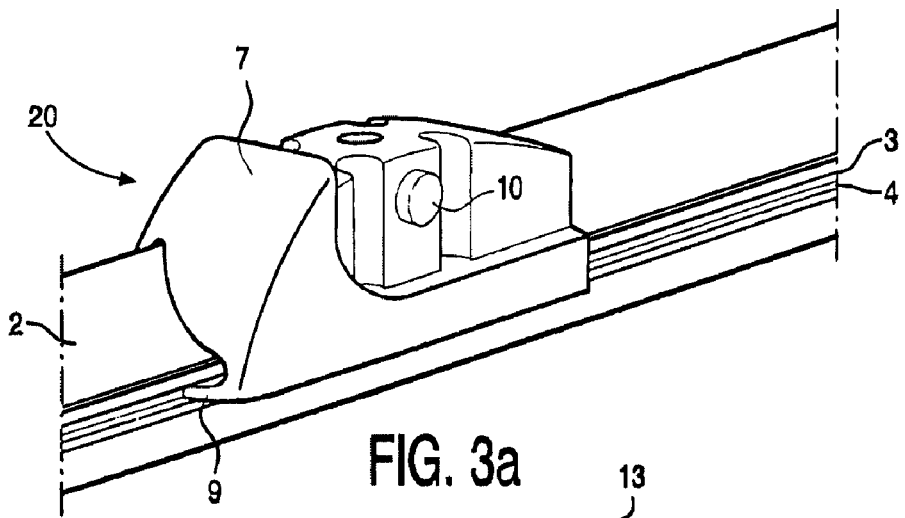
Figure 3B:
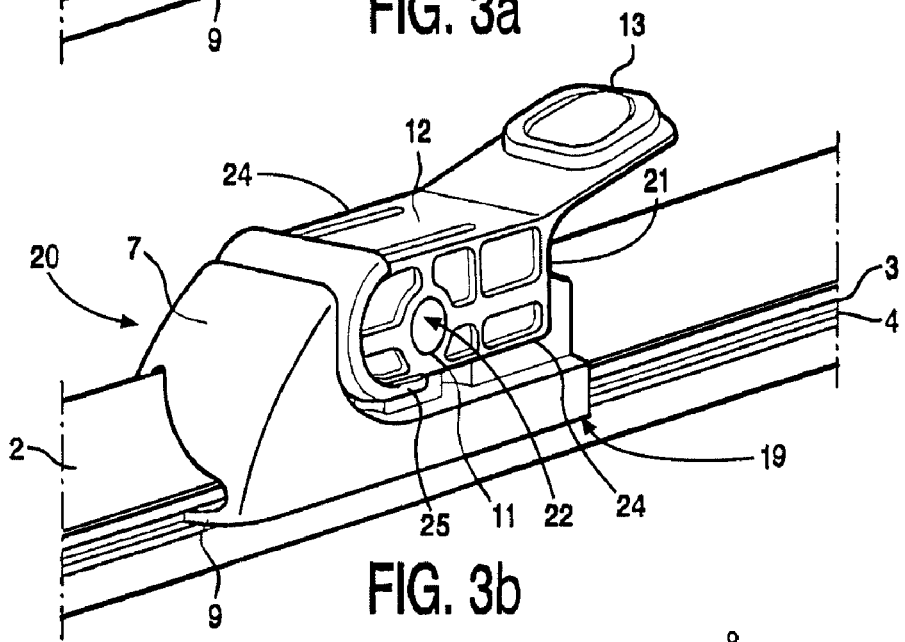
Figure 3C:
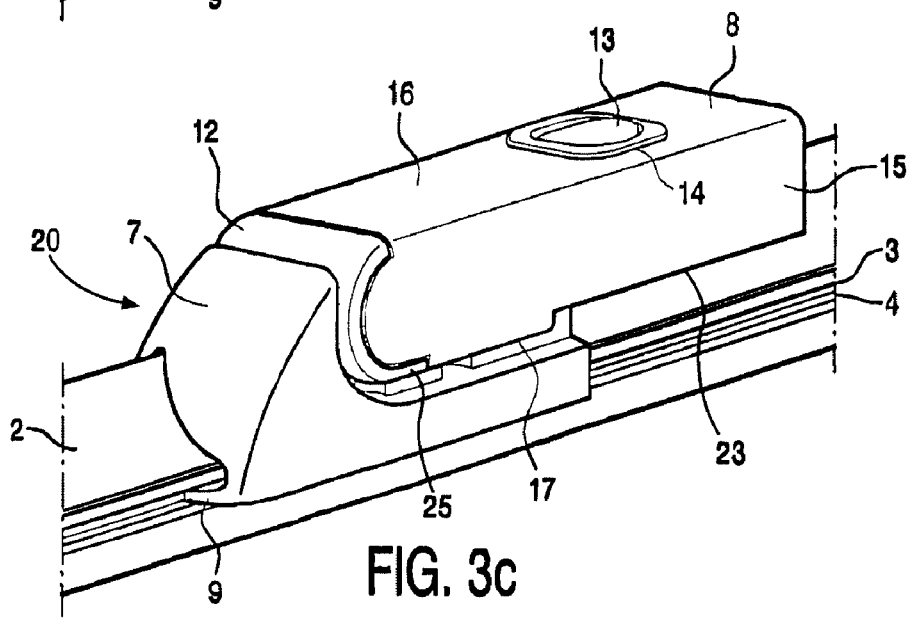

FIGS. 3a, 3b and 3c correspond to FIGS. 2a, 2b and 2c, respectively, with the difference that one resilient tongue 13 in FIG. 3 fitting in a hole 14 provided in a base 16 of the U-shaped cross-section (FIG. 3c).

Referring to both FIGS. 2 and 3, while mounting the oscillating wiper arm 8 onto the connecting device 7/joint part 12, the resilient tongue(s) 13 is/are initially pushed in against a spring force and then allowed to spring back into said hole(s) 14, thus snapping, that is clipping the resilient tongue(s) 13 into the hole(s) 14. This is a so-called bayonet-connection. It will be seen from FIG. 3b that the tongue 13, when in a free state prior to connection with the oscillating arm 8, extends away at an upward angle from the joint part 12.

Figure 4:
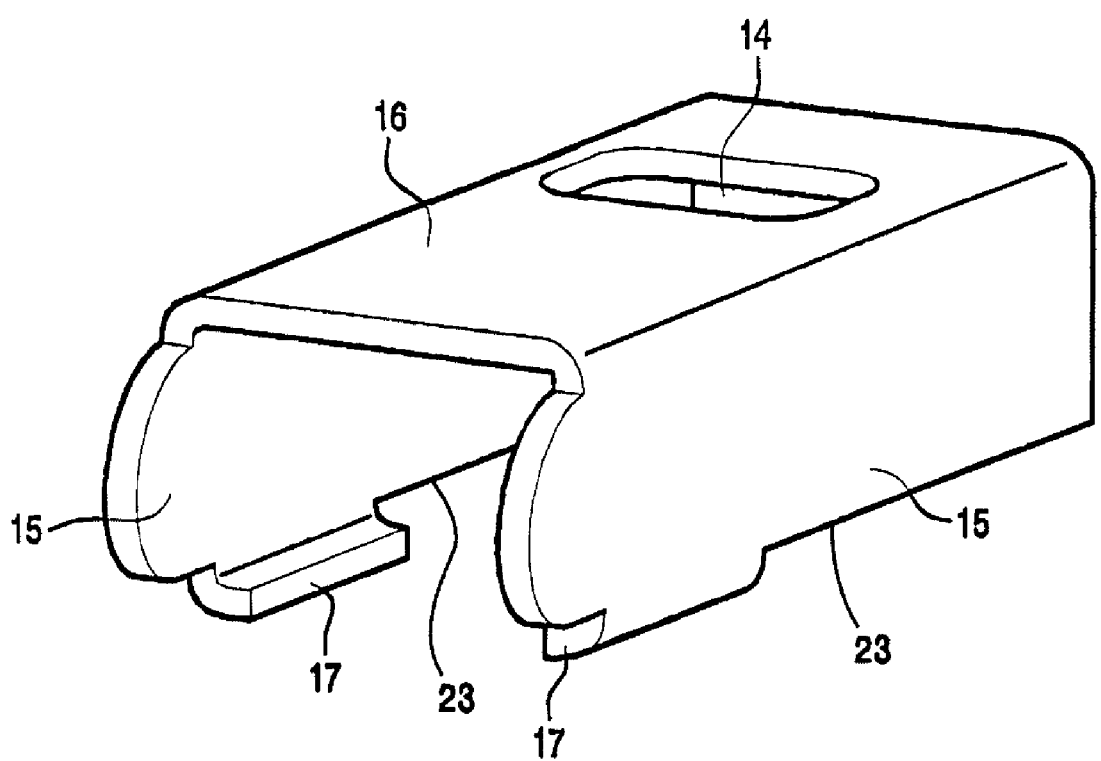
FIG. 4 is a perspective and schematic view of an end of an oscillating wiper arm used in FIG. 3.

Each leg or side wall 15 of the U-shaped cross-section comprises clamping members which engage around longitudinal sides of said joint part 12 that face away from each other. In FIGS. 2,3 and 4 these clamping members are formed as inwardly bended edges 17 integral with the legs 15 of the U-shaped cross-section, serving to further enhance the retention of the oscillating arm 8 onto the connecting device 7/joint part 12 in vertical direction, that is perpendicular to the longitudinal direction of the oscillating wiper arm 8. As shown in FIGS. 2c, 3c and 4. the inwardly bent edges 17 extend from a lower longitudinal free edge 23 of the side walls 15 and wrap beneath the longitudinal sides 24 of the joint part 12. As also appreciated from these figures, the joint part 12 has outwardly projecting protrusions 25 formed along the longitudinal sides 24 of the joint part adjacent the bent edges 17, and extend beneath the longitudinal lower edges 23 of the side walls 15. As also shown here, the bent edges 15 abut the outwardly projecting protrusions 25, and the protrusions 25 are flush with an outer surface of the side walls 15.

Possibly, a spoiler 18 is furthermore provided (FIG. 1).

In order to achieve a good connection at the location of the protrusions 10, the distance between these protrusions 10 (from tip to tip) divided by the length of the wiper blade 2 from tip to tip) is larger than 0.02(2%). Said distance between the protrusions 10 preferably varies between 10 and 20 mm.

The invention is not restricted to the variants shown in the drawing, but it also extends to other embodiments that fall within the scope of the appended claims.

We claim:

1. A windscreen wiper assembly, comprising:
a wiper member having a wiper blade element and a carrier supporting said wiper blade element and including a pivot;
an oscillating arm;
a joint part that is joined to said pivot to establish a pivot connection between said joint part and said wiper member about a pivot axis of said pivot and having a generally U-shaped cross section at the location of the pivot connection;

said oscillating arm having a substantially U-shaped cross section with a base and two side walls extending downwardly from said base;

said joint part being received within said oscillating arm and including a resilient tongue received in a corresponding hole provided in said oscillating arm;

said side walls of said oscillating arm including inwardly bent edges that extend from a lower longitudinal free edge of said side walls and wrap beneath longitudinal sides of said joint part, and said joint part including outwardly projecting protrusions formed along said longitudinal sides of said joint part adjacent said bent edges of said oscillating arm and extending beneath said longitudinal lower edges of said side walls.

2. The assembly of claim 1 wherein said inwardly bent edges abut said outwardly projecting protrusions.

3. The assembly of claim 1 wherein said protrusions are flush with an outer surface of said side walls of said oscillating arm.

4. The assembly of claim 1 wherein said resilient tongue, when in a free state prior to connection with said oscillating arm, extends away from said joint part at an angle.

* * * * *